UNITED STATES PATENT OFFICE.

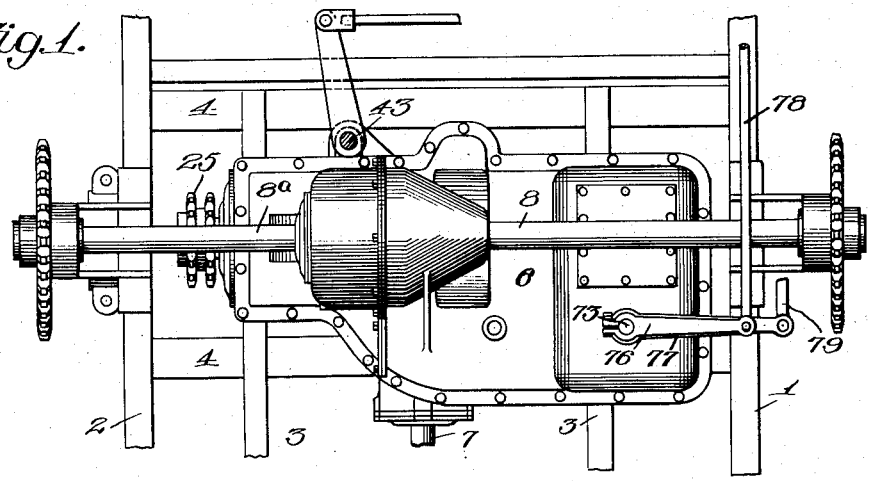
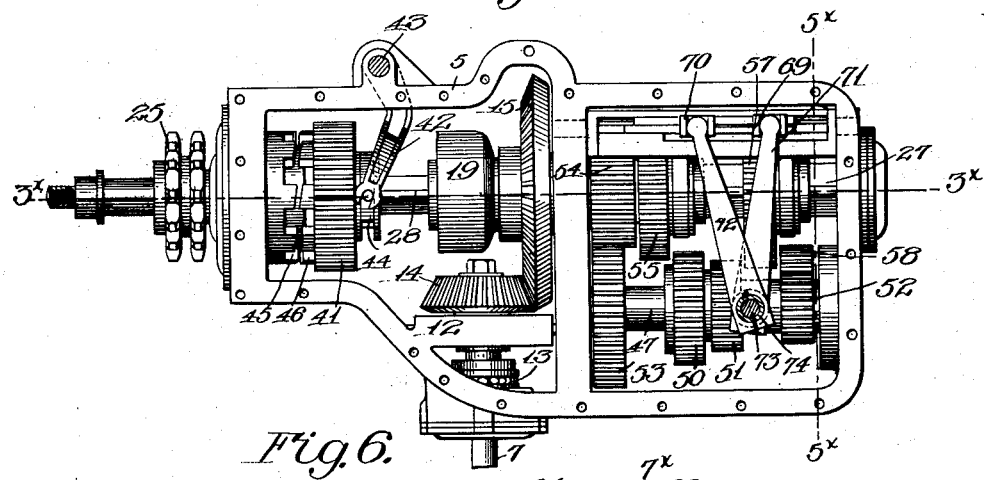
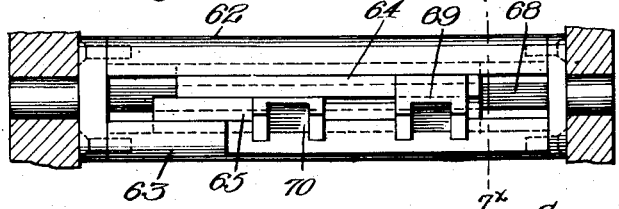

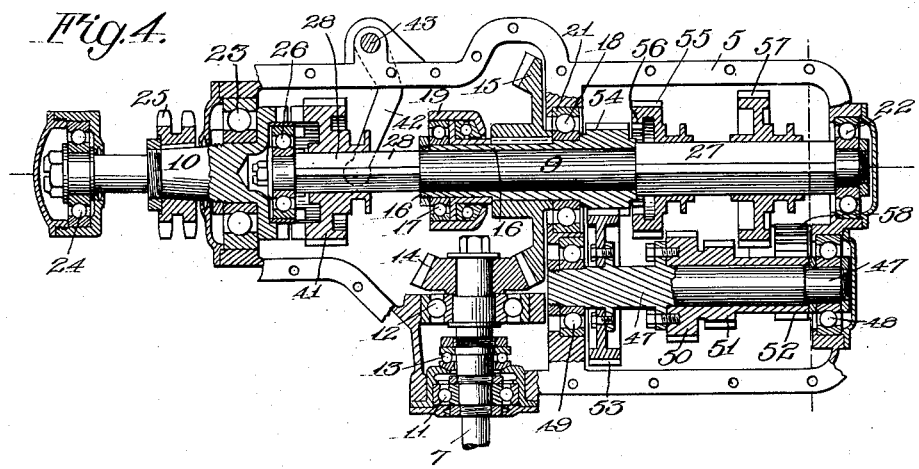
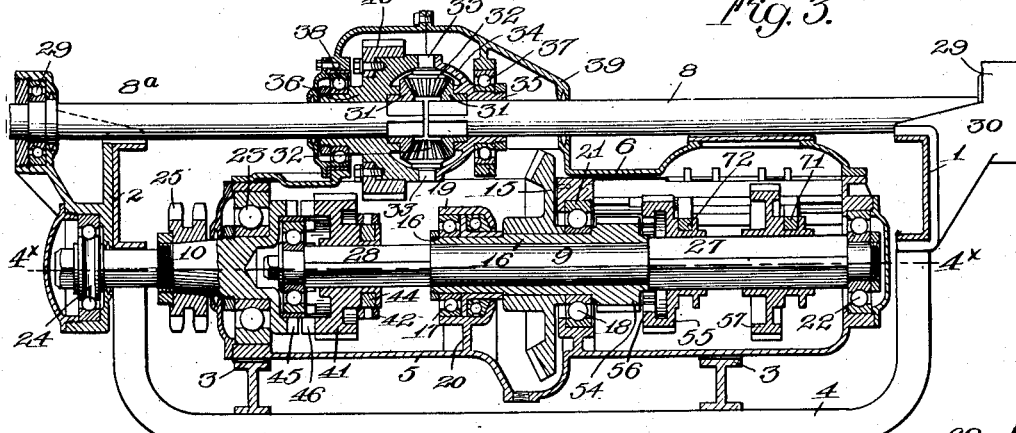
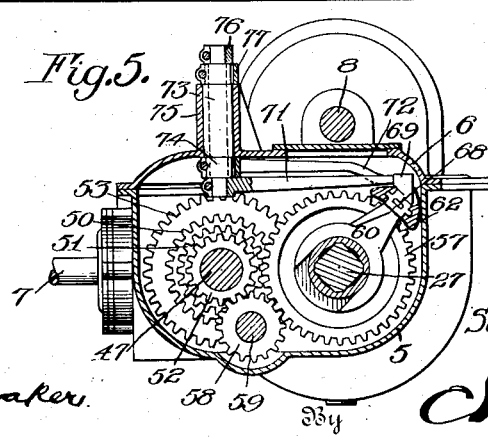

SAMUEL W. LUITWIELER, OF ROCHESTER, NEW YORK.

VARIABLE-SPEED MECHANISM.

1,023,084.    Specification of Letters Patent.    Patented Apr. 9, 1912.

Original application filed August 31, 1908, Serial No. 451,109. Divided and this application filed March 11, 1911. Serial No. 613,752.

*To all whom it may concern:*

Be it known that I, SAMUEL W. LUIT-WIELER, of Rochester, in the county of Monroe and State of New York, have invented certain new and useful Improvements in Variable-Speed Mechanism; and I do hereby declare the following to be a full, clear, and exact description of the same, reference being had to the accompanying drawings, forming a part of this specification, and to the reference-numerals marked thereon.

My present invention relates to variable speed transmission mechanism such as is commonly employed for motor driven vehicles, and it has for its object to provide a mechanism of this character which is adapted particularly to be employed for transmitting power from a motor to two different sets of driven devices alternately, whereby one or the other of them may be operated at variable speeds.

My invention has for its further object to provide transmission mechanism which may be employed in connection with motor driven vehicles or automobiles on which are mounted some special apparatus such as a fire pump, hoisting mechanism or the like, which is to be operated when the vehicle is at rest, parts of the mechanism being adapted to serve as a means for driving the vehicle under normal conditions, and when the latter is stopped at a desired location, to be then employed for actuating the mechanism mounted on the vehicle.

To these and other ends the invention consists in certain improvements and combinations of parts all as will be hereinafter more fully described, the novel features being pointed out in the claims at the end of the specification.

In the drawings: Figure 1 is a top plan view of transmission mechanism adopted as an illustration of one embodiment of my invention; Fig. 2 is a plan view of the lower section of the gear casing showing the arrangement of the gear wheels therein; Fig. 3 is a vertical sectional view taken on the line $3^x$—$3^x$ of Fig. 2; Fig. 4 is a horizontal sectional view taken on the line $4^x$—$4^x$ of Fig. 3; Fig. 5 is a cross-sectional view taken on the line $5^x$—$5^x$ of Fig. 2; Fig. 6 is a detail plan view showing the guideway in which the gear shifting forks are supported, and Fig. 7 is a detail elevation showing one of the forks, said view being partly in section taken on the line $7^x$—$7^x$ of Fig. 6.

Similar reference numerals throughout the several figures indicate the same parts.

This application is a division of my prior application for patent for auto propelled vehicles, filed August 31, 1908, and bearing Serial No. 451,109, in which I disclosed transmission mechanism adapted particularly to be used in conjunction with automobile fire apparatus, said mechanism being adapted to alternately operate either the driving wheels of the vehicle or the fire pump mounted thereon.

In the present embodiment, I have shown the transmission mechanism arranged with its driven shafts extending transversely across the motor vehicle frame, portions of the side pieces of which are indicated by 1 and 2, and between which the transmission mechanism is supported upon I-beams 3, carried on depending hangers 4 attached at their ends to the side pieces of the frame, which latter also serves as a support for the bearings in which the transmission shafts are mounted, by which arrangement of parts a very rigid construction is obtained.

The transmission mechanism is arranged in the casing, comprising a lower section or base 5 and an upper section or top 6, said parts being provided with bolting flanges at their meeting edges. The mechanism in general comprises a motor shaft 7 which may be driven from any suitable source of power or connected directly with the driving shaft of an internal combustion engine, as will be understood. In addition to the shaft just mentioned, there is a motor vehicle driving or jack shaft 8 and a driven shaft 9 through which, by means of various change speed gears and clutch connections, the power from the shaft 7 may be transmitted either to the jack shaft or to the driving shaft 10 employed for operating the auxiliary mechanism carried on the vehicle. The shaft 7 extends laterally of the lower section 5 of the casing and is supported in an external bearing 11 and an internal bearing 12, and between it and the casing is also arranged a thrust bearing 13. At the inner end of the shaft is a bevel pinion 14 meshing with the bevel gear wheel 15 which is rigidly secured to a sleeve 16 journaled at its two ends in the bearings 17 and 18, the former being held in a ring 19 attached to the bottom of the casing by a web 20, while the bearing 18 is secured in the rib 21 extending transversely of the casing. In alinement with the bearings just described, and arranged at each end of the lower section 5 of the casing are other bearings 22 and 23, the former supporting one end of the shaft 9 and the latter carrying the inner end of the auxiliary driving shaft or axle 10, the outer end of which is also supported in a bearing 24 rigidly secured to the side piece 2 of the frame. Intermediate said bearings the shaft 10 is provided with a driving pulley or sprocket wheel 25 from which power may be transmitted by a belt or shaft to the pump or other apparatus carried on the vehicle. The inner end of the shaft 10 is recessed to receive one end of the shaft 9 and between these two parts is arranged a bearing 26. The shaft 9 is of angular cross-section formation at its opposite ends for a portion of its length, as indicated at 27 and 28, the part 27 being preferably of larger diameter than the central cylindrical portion of the shaft, which is supported in the sleeve 16, thus forming a shoulder which coöperates with one end of said sleeve, the smaller portion 28 of the shaft permitting it to be easily inserted or removed from the sleeve in assembling or dismounting the parts.

The jack shaft which is employed as a means of transmitting power to the driving wheels of the vehicle is made in two parts 8 and 8ª, each section being supported at its outer end in bearings 29 supported on brackets or out-riggers 30 projecting from the side pieces 1 and 2 of the vehicle frame. On each end of the jack shaft is a sprocket wheel which is located in alinement with the corresponding sprocket wheel attached to the rear or driving wheels of the vehicle. The adjacent ends of the shaft sections 8 and 8ª are connected by differential gearing comprising the opposed bevel gear wheels 31 between which are arranged a plurality of pinions 32. In the present instance these pinions are provided with bosses 33 journaled in a spherical shell 34. The right and left hand ends of the shell are extended to form sleeves 35 and 36 which are journaled in bearings 37 and 38, respectively, said bearings being supported in a cap or housing 39 arranged on the top piece or cover 6 of the casing. On the sleeve 36 of the shell is secured a toothed ring 40 with which coöperates the main driving connecting member employed as a means of connection between the shaft 9 and the jack shaft 8, and also between the shafts 9 and 10. This member is constructed in the form of a gear wheel 41 mounted for longitudinal movement on the angular portion 28 of the shaft 9, and capable of adjustment into and out of engagement with the gear 40 by means of a lever 42 mounted on the rock shaft 43, and carrying pins 44 which engage in an annular recess in the hub of said gear. The rim at the enlarged inner end of the shaft 10 is provided with notches or indentations 45 with which coöperate corresponding teeth or projections 46 formed on the adjacent side face of the gear 41.

Arranged parallel with the shaft 9 and on one side thereof is a counter shaft 47 journaled at its ends in bearings 48 and 49 to which is rigidly attached the intermediate speed pinion 50, the low speed pinion 51 and reverse pinion 52. The counter shaft is rotated continuously, motion being imparted thereto through the gear wheel 53 which meshes with the pinions 54 formed integrally with the sleeve 16.

The sliding gear wheels are mounted on the angular portion 27 of the shaft 9 for effecting the necessary connections whereby the transmission mechanism may be operated at either high or intermediate speeds, and at low speed or in the reverse direction. One of these gear wheels is indicated at 55 and is of suitable diameter to coöperate with the intermediate speed pinion 50. This gear wheel is made hollow and provided with internal teeth 56 adapted to coöperate with the teeth of the pinion 54 when the gear wheel is adjusted laterally out of engagement with the pinion 50. The other gear wheel is indicated at 57 and is of larger diameter than the one last described, and adapted to coöperate, when moved in one direction, with the low speed pinion 51, and when adjusted in the opposite direction, to be brought into mesh with the idler 58 which is in mesh at all times with the reverse pinion 52, said idler being journaled on a stud 59 projecting inwardly from the end of the gear casing.

The adjustment of the sliding gears 55 and 57 is accomplished by means of the arms 60 and 61, shown particularly in Figs. 5 and 7, having the bifurcated or forked ends which fit the annular channels in the hubs of said gear wheels. The shifting arms extend to one side of and upwardly from the shaft 9 to a point near the side of the casing where they are received between two longitudinal guideways or rails 62 and 63. As a means for holding the arms in proper position without in any way depending upon their connection with their respective gear wheels, I provide each with a laterally extending runner, the one on the arm 60 being indicated by 64, while that on the arm 61 is indicated by 65. The first mentioned runner bears against the face of the rail 62 and is provided with a tongue 66 fitting in a corresponding groove therein. The runner 65 similarly engages the inner face of the rail 63 and is provided with the tongue 67 fitting the recess therein. The adjacent faces of the two runners are also grooved to receive the key or intermediate guide bearing 68. Extending upwardly from the runners 64 and 65, respectively, are the socket pieces 69 and 70 which receive the ends of the levers 71 and 72, the former being connected to the vertically extending post 73, and the latter attached to the sleeve 74 surrounding the shaft and journaled in the hub or boss 75 on the top section of the gear casing. Other levers 76 and 77 extend from the shaft and sleeve last mentioned, and are adapted to be actuated by rods 78 and 79 leading to any convenient point of operation on the vehicle, such for instance as in proximity to the driver's seat, where they are in turn connected to the usual shifting levers.

The operation of the mechanism will now be readily understood. When it is desired to impart movement to the jack shaft comprising the parts 8 and 8ª, the operating member or gear wheel 41 is shifted into engagement with the gear wheel 40, being then disconnected from the auxiliary driving shaft. Now, by adjustment of one or the other of the gear wheels 55 and 57 the shaft 9 may be caused to rotate at either high, low or intermediate speed. The auxiliary driving shaft may be similarly actuated by shifting the operating member or gear wheel 41 from the position last described until its teeth 46 interlock with the notches or recesses 45 on the shaft 10. In arranging these parts, it will be noticed that the gear wheel 40 and the shaft 10 are spaced a sufficient distance apart so that when the member 41 is adjusted, it is entirely disconnected from one side of the driving device before it is brought into engagement with the other.

Transmission mechanism constructed in accordance with my invention consists of few parts which are simple in construction and compactly arranged. The arrangement of the bearings permits the various revoluble parts to be rigidly supported in the casing, and these with the bearings adapted to be mounted on the frame of the vehicle, provide a very rigid structure capable of heavy duty such as is required of mechanism of this character when applied to trucks intended for transporting heavy loads or for heavy automobile fire apparatus.

I claim as my invention:

1. In a variable speed transmission gearing, the combination with a driving shaft, of a primary mechanism, an auxiliary mechanism, change speed mechanism interposed between the driving shaft and the auxiliary mechanism and between the driving shaft and the primary mechanism, and a single controlling means for operatively connecting the speed mechanism alternately with the primary mechanism and with the auxiliary mechanism.

2. In a variable speed transmission gearing, the combination with a driving shaft, of a primary mechanism, an auxiliary mechanism, a change speed mechanism interposed between the driving shaft and the primary mechanism, and between the driving shaft and the auxiliary mechanism, and a single controlling means for operatively connecting the speed mechanism alternately with the primary mechanism and with the auxiliary mechanism.

3. In a variable speed transmission gearing, the combination with a driving shaft, of primary mechanism, an auxiliary mechanism, a change speed mechanism interposed between the driving shaft and the primary mechanism, and between the driving shaft and the auxiliary mechanism, and a single controlling means movable in one direction for operatively connecting the speed mechanism with the primary mechanism, and in another direction for operatively connecting the speed mechanism with the auxiliary mechanism.

4. In a variable speed mechanism gearing, the combination with a driving shaft, of a driven shaft, change speed mechanism interposed between the driving shaft and the driven shaft, a primary mechanism, an auxiliary mechanism, and a single controlling means for alternately connecting the driven shaft with the primary mechanism and with the auxiliary mechanism.

5. In a variable speed transmission gearing, the combination with a driving shaft, of a driven shaft, change speed mechanism interposed between the driving shaft and the driven shaft, a primary mechanism, an auxiliary mechanism, and controlling means carried by the driven shaft and adapted to alternately connect the latter with the primary mechanism and the auxiliary mechanism.

6. In a variable speed transmission gearing, the combination with a driving shaft, of a driven shaft, change speed mechanism interposed between the driving shaft and the driven shaft, a primary mechanism, an auxiliary mechanism, and a controlling means slidably mounted on the driven shaft, and adapted to alternately connect the latter with the primary mechanism and the auxiliary mechanism.

7. In a variable speed transmission gearing, the combination with a driving shaft, of a driven shaft, change speed mechanism interposed between the driving shaft and the driven shaft, a primary mechanism, an auxiliary mechanism, and a controlling means carried by the driven shaft and adapted to alternately connect the latter with the primary mechanism and the auxiliary mechanism.

8. In a variable speed transmission gearing, the combination with a driving shaft, of a driven shaft, a sleeve loosely mounted on the driven shaft and operatively connected to the driving shaft, a change speed mechanism operatively connected to the sleeve embodying a plurality of gear wheels, adjustable gear wheels slidably mounted on one end of the driven shaft and adapted to mesh alternately with the gear wheels of the change speed mechanism, a primary mechanism, an auxiliary mechanism, and a connecting member slidably mounted on the opposite end of the driven shaft adapted to alternately connect the latter with the primary mechanism and the auxiliary mechanism.

9. In a variable speed transmission gearing, the combination with a driving shaft, of a driven shaft, a sleeve loosely mounted on the driven shaft and operatively connected to the driving shaft, a change speed mechanism operatively connected to the sleeve embodying a plurality of gear wheels, other gear wheels slidably mounted on one end of the driven shaft and adapted to mesh alternately with the gear wheels of the change speed mechanism, a primary mechanism, an auxiliary mechanism, and a connecting member slidably mounted on the opposite end of the driven shaft, said connecting member being provided with two engaging surfaces, one for operatively connecting the driven shaft to the primary mechanism and the other for operatively connecting the driven shaft with the auxiliary mechanism.

10. In a variable speed transmission gearing, the combination with a driving shaft, of a driven shaft, a sleeve loosely mounted on the driven shaft and operatively connected to the driving shaft, a change speed mechanism operatively connected to the sleeve embodying a plurality of gear wheels, other gear wheels slidably mounted on the driven shaft, means for moving one of said gear wheels into engagement with one of the gear wheels of the change speed mechanism, comprising guides, and arms movable in said guides and connected to the gear wheels, a primary mechanism, an auxiliary mechanism, and a connecting member mounted on the driven shaft, adapted to alternately connect the latter with the primary mechanism and the auxiliary mechanism.

11. In a variable speed transmission gearing, the combination with a primary driving shaft, of a secondary driving shaft operatively connected to the primary driving shaft, a driven shaft, change speed mechanism interposed between the secondary driving shaft and the driven shaft, a primary mechanism, an auxiliary mechanism, and a single controlling means for operatively connecting the driven shaft alternately with primary mechanism and the auxiliary mechanism.

12. In a variable speed transmission gearing, the combination with a driving shaft, of a driven shaft, change speed mechanism interposed between the driving shaft and the driven shaft embodying a plurality of gear wheels, other gear wheels slidably mounted on the driven shaft and adapted to mesh alternately with the gear wheels of the change speed mechanism, means for actuating said slidably mounted gear wheels comprising arms connected to the latter, runners mounted on the arms, a pair of guides having engagement with the outer faces of the runners, a guide arranged intermediate said pair of guides and in engagement with the inner adjacent faces of the runners, and operating means connected to the runners.

SAMUEL W. LUITWIELER.

Witnesses:
F. F. CHURCH,
HENRY W. HALL.